Dec. 29, 1964   C. W. PRIDGEON   3,163,302
HAY BALE ACCUMULATOR
Filed April 2, 1962   5 Sheets-Sheet 1

INVENTOR.
CLIFFORD W. PRIDGEON
BY
ATTORNEYS

Dec. 29, 1964   C. W. PRIDGEON   3,163,302
HAY BALE ACCUMULATOR
Filed April 2, 1962   5 Sheets-Sheet 2
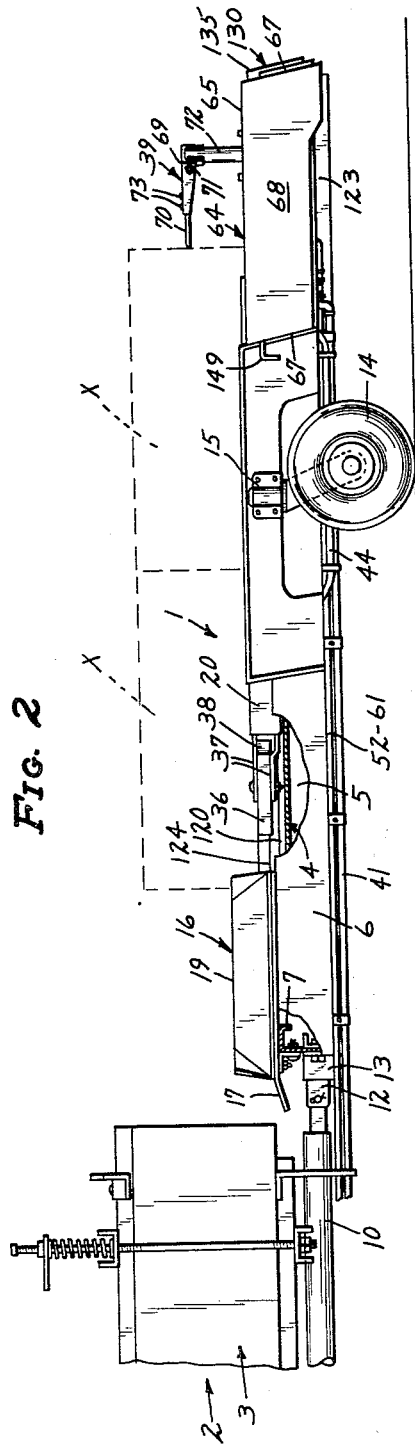
FIG. 2
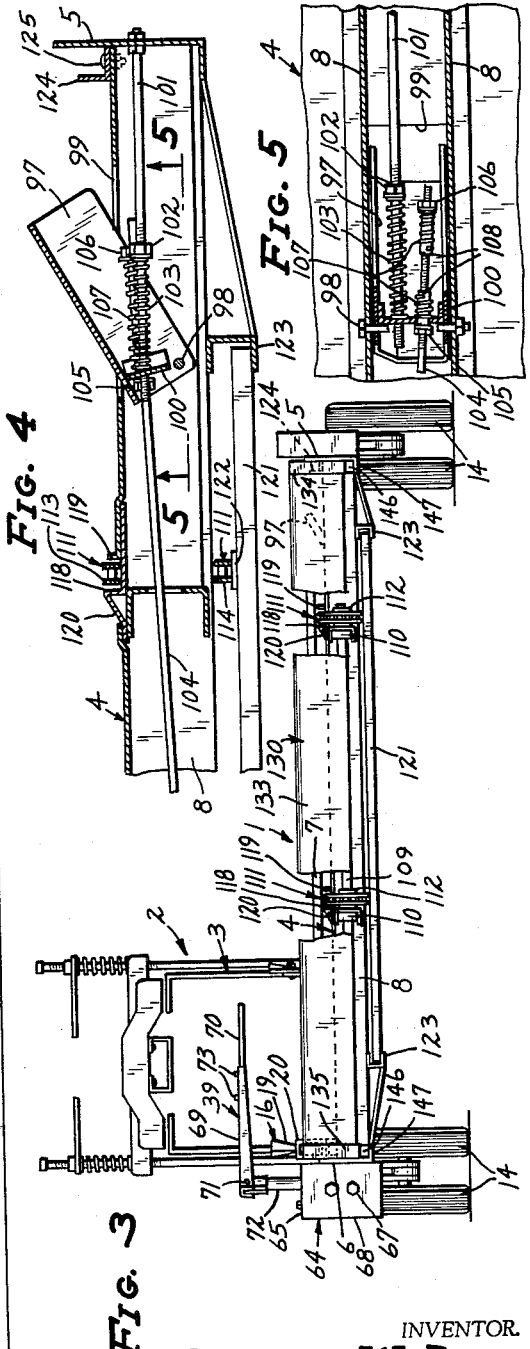
FIG. 3
FIG. 4
FIG. 5
INVENTOR.
CLIFFORD W. PRIDGEON
BY
Merchant, Merchant & Gould
ATTORNEYS

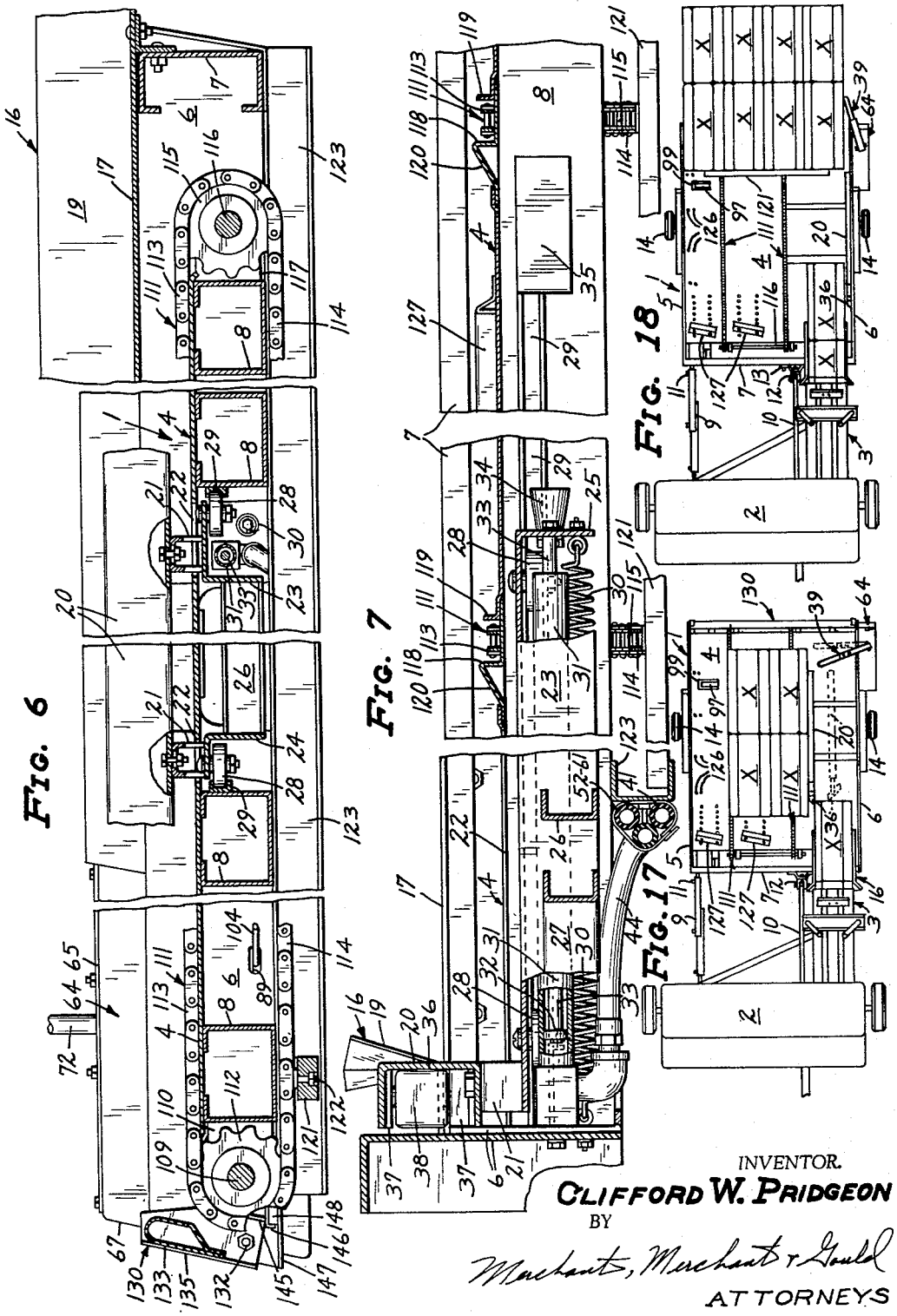

Dec. 29, 1964
C. W. PRIDGEON
3,163,302
HAY BALE ACCUMULATOR
Filed April 2, 1962
5 Sheets-Sheet 4
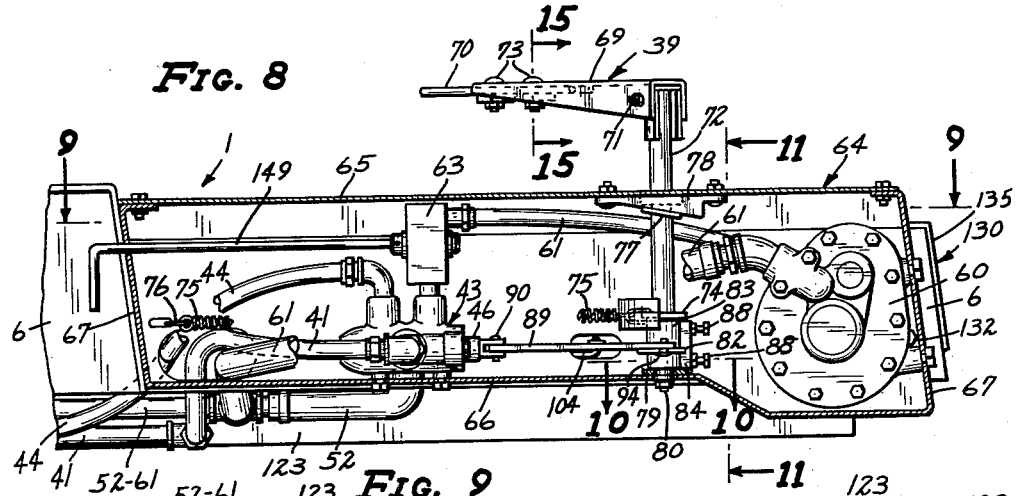
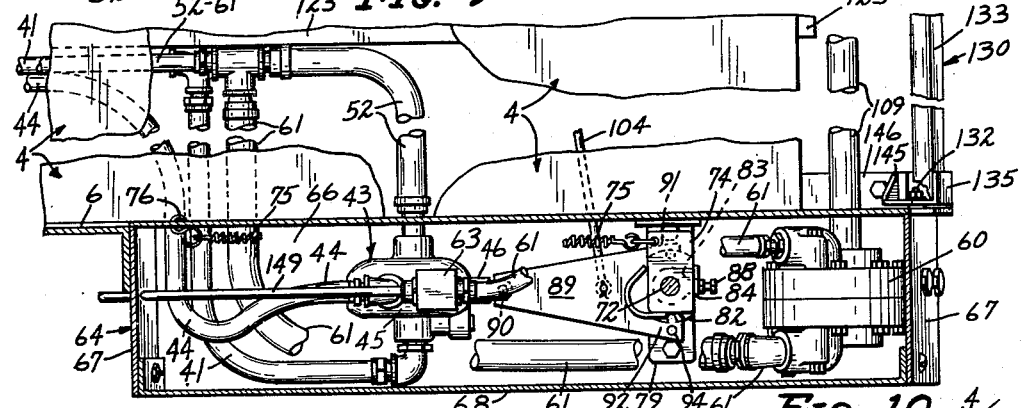
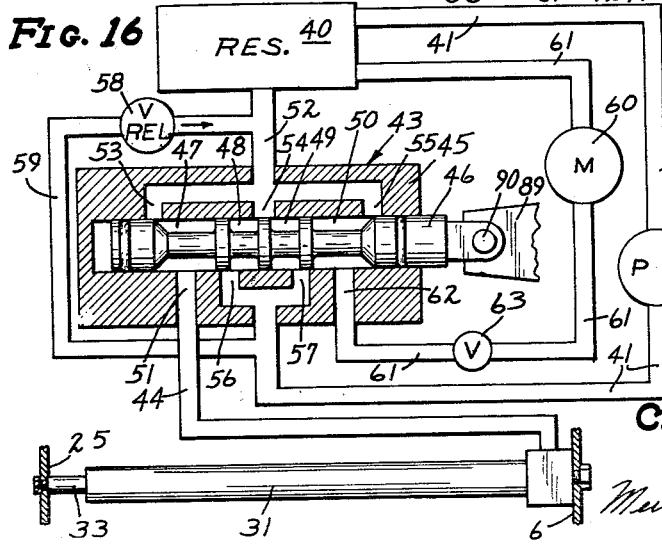
INVENTOR.
CLIFFORD W. PRIDGEON
BY
Merchant, Merchant & Gould
ATTORNEYS Dec. 29, 1964  C. W. PRIDGEON  3,163,302
HAY BALE ACCUMULATOR
Filed April 2, 1962  5 Sheets-Sheet 5
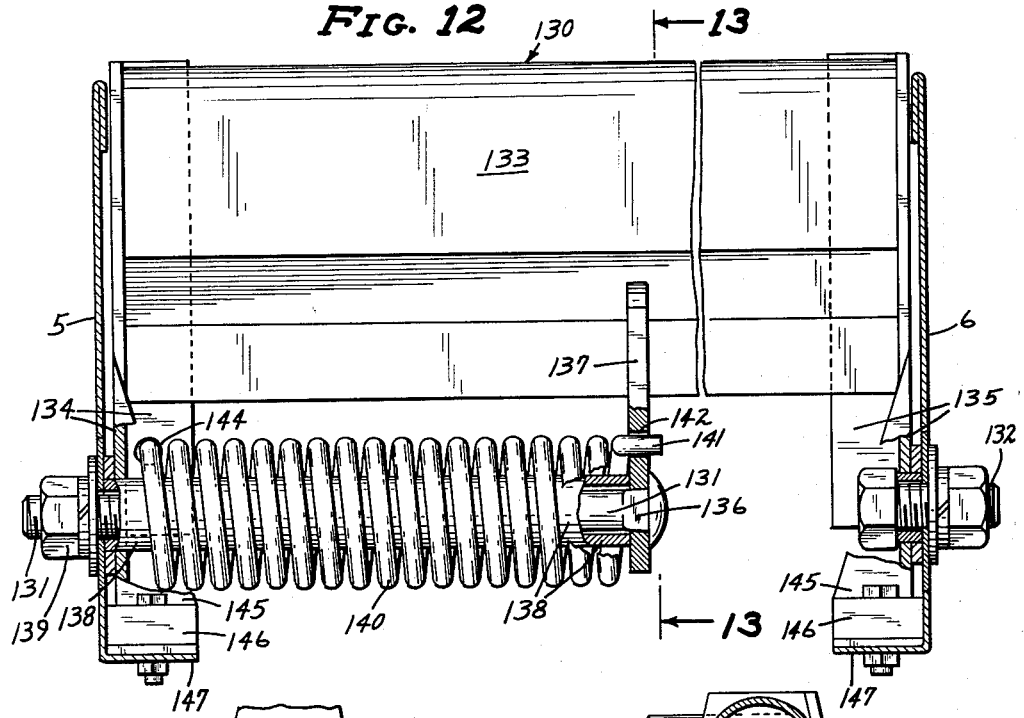
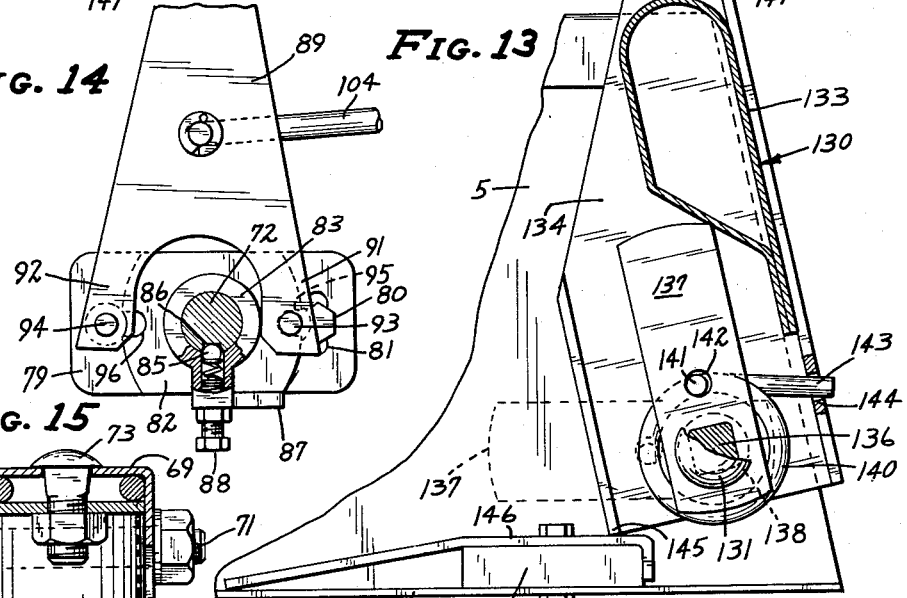
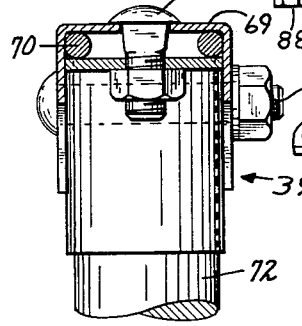
INVENTOR.
CLIFFORD W. PRIDGEON
BY
Merchant, Merchant & Gould
ATTORNEYS

United States Patent Office 3,163,302
Patented Dec. 29, 1964

3,163,302
HAY BALE ACCUMULATOR
Clifford W. Pridgeon, Chinook, Mont., assignor to Daffin Company, Hopkins, Minn., a corporation of Delaware
Filed Apr. 2, 1962, Ser. No. 184,218
11 Claims. (Cl. 214—6)

My invention relates generally to agricultural implements, and more particularly to equipment for handling bales of hay, straw or the like, discharged from baling machines.

More specifically, my invention relates to a machine for receiving and disposing bales in a predetermined group arrangement, and depositing said bales in said group arrangement on the ground for further disposition.

In the harvesting of hay crops, mobile baling devices are often used, the bales of hay being discharged to the ground as they are formed, after which wagons or trucks are driven over the field and the bales loaded thereon for transport to a place of storage or the like. In some instances, trailer vehicles are attached to the baling machine for reception of bales discharged therefrom; and usually, the bales are manually arranged or stacked on the trailer vehicle as they are received thereon, often in haphazard fashion. When the load of bales is brought to a stack and the bales placed on the stack by hand or with the use of a conventional hoist, considerable manual effort is often required to properly orientate the bales on the stack. My present invention contemplates a bale accumulator which may be used in cooperation with bale loading and stacking devices generally of the type disclosed in my prior United States Letters Patent No. 2,962,117, wherein a plurality of bales orientated in a pre-arranged group may be picked up and loaded on a vehicle for transport or placed on a stack at a desired location without the necessity for manual lifting or arranging of the bales.

An important object of my invention is the provision of a mobile hay bale accumulator which, in accumulating and arranging bales in uniform groups thereof in a field, eliminates the necessity for manual handling of the bales.

Another object of my invention is the provision of a mobile hay bale accumulator of the type set forth, having novel means for automatically arranging collected bales in face-to-face engagement and for automatically depositing said bales in the arranged relationship on the ground without reduction of ground speed of the accumulator.

Another object of my invention is the provision of novel means for accumulating and disposing bales in a predetermined group arrangement, and for discharging of the group of bales to the ground rearwardly of the direction of movement of the accumulator and at a speed substantially equal to the forward speed of movement of the accumulator, whereby the group may be deposited on the ground rearwardly of the accumulator without unduly disturbing the group arrangement.

Still another object of my invention is the provision of a mobile platform for attachment to a baling machine for common traveling movements therewith and for receiving bales delivered thereto by the baling machine, transfer means for moving said bales in a direction transversely of the direction of delivery movement thereof, and means for moving an accumulated group of delivered bales rearwardly with respect to traveling movement of the platform to cause the same to be deposited on the ground rearwardly of the platform.

Another object of my invention is the provision of means including a bale sensing element operative responsive to said delivery movement of bales on said platform to control operation of said transfer means, and sensing means cooperating with said sensing element to control rearward discharge of the group of accumulated bales from said platform. The above and still further highly important objects and advantages of my invention will become apparent from the following detailed specification, appended claims and attached drawings.

The specific machine shown in the drawings, and more particularly described hereinafter, discloses a preferred embodiment of my invention, said embodiment further incorporating improvements made jointly by me and others and disclosed and claimed in the Pridgeon et al. application, filed December 19, 1962, Serial No. 245,903. My sole invention incorporated in the preferred embodiment thereof disclosed herein is defined in the claims of this application.

Referring to the drawings, which illustrate the invention, and in which like reference characters indicate like parts throughout the several views:

FIG. 2 is a view in side elevation, some parts being broken away and some parts being shown in section;

FIG. 3 is a view in rear elevation, some parts being broken away;

FIG. 4 is an enlarged fragmentary section taken substantially on the line 4—4 of FIG. 1;

FIG. 5 is a fragmentary section taken on the line 5—5 of FIG. 4;

FIG. 6 is an enlarged fragmentary section taken substantially on the irregular line 6—6 of FIG. 1, and inverted, some parts being broken away;

FIG. 7 is an enlarged fragmentary transverse section taken substantially on the line 7—7 of FIG. 1, some parts being broken away;

FIG. 8 is an enlarged fragmentary view partly in section and partly in side elevation, taken on the line 8—8 of FIG. 1;

FIG. 9 is a fragmentary view partly in horizontal section and partly in top plan, taken substantially on the line 9—9 of FIG. 8, some parts being broken away;

FIG. 10 is an enlarged fragmentary section taken substantially on the line 10—10 of FIG. 8;

Figure 1:
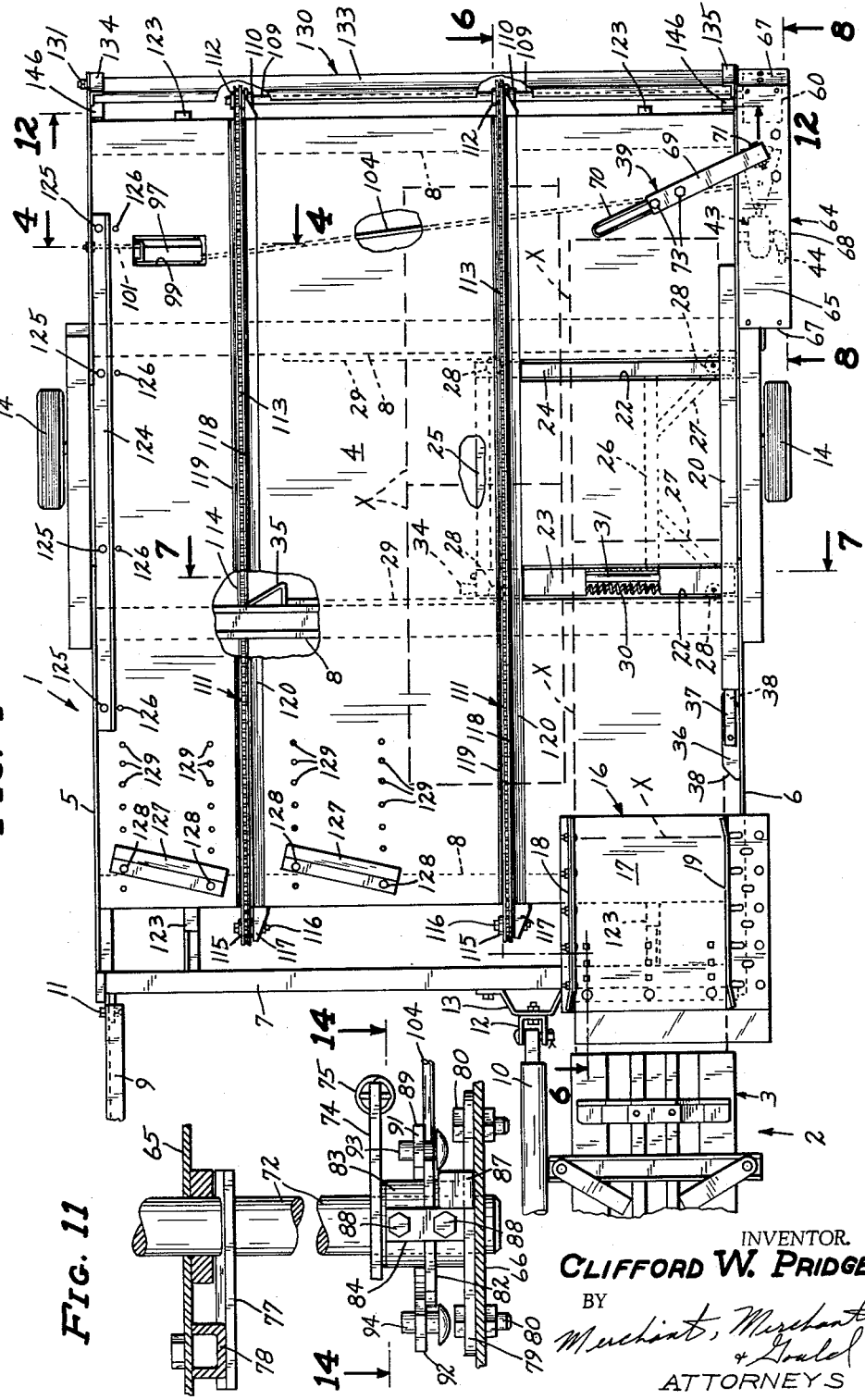
FIG. 1 is a view in top plan of a hay bale accumulator made in accordance with my invention, some parts being broken away and some parts being shown in section.

FIG. 11, sheet 1, is an enlarged fragmentary section taken substantially on the line 11—11 of FIG. 8;

FIG. 12 is an enlarged transverse section taken substantially on the line 12—12 of FIG. 1, some parts being broken away;

FIG. 13 is a transverse section taken substantially on the line 13—13 of FIG. 12;

FIG. 14 is a fragmentary detail, partly in plan and partly in horizontal section, taken on the line 14—14 of FIG. 11;

FIG. 15 is an enlarged fragmentary detail in section, taken substantially on the line 15—15 of FIG. 8;

FIG. 16 is a diagrammatic view of the fluid pressure system incorporated in the accumulator, and;

FIGS. 17 and 18 are views in top plan illustrating the operation of the accumulator in connection with a hay baling machine.

In the preferred embodiment of the invention illustrated, a mobile platform, indicated in its entirety by the numeral 1, is adapted to be coupled to a commercial mobile hay baling machine 2 for common traveling movements therewith, and for reception of hay bales or the like from the discharge portion 3 of the baling machine 2. The present invention further involves means for arranging the bales in one or more rows on the platform 1, said rows extending transversely thereof, and means responsive to accumulation of a predetermined number of bales in said row or rows, for discharging of the accumulated group of bales to the ground as the platform 1 moves over the field. Preferably, the direction of delivery movement of the group of bales from the platform to the ground is rearwardly with respect to forward movement of the platform 1, the speed of rearward delivery movement of the bales being substantially equal to the speed of forward movement of the platform 1 and baling machine 2, so that the bales are delivered to the ground without unduly disturbing the group arrangement in which the bales were disposed on the platform 1 prior to said rearward delivery thereof.

As shown, the platform 1 comprises a rectangular generally flat top or deck 4, laterally spaced parallel side frame members 5 and 6, a front transverse frame member 7, and a plurality of longitudinally spaced parallel cross frame members 8 which underlie and support the deck 4. The platform 1 is shown as being secured to the hay baling machine 2 by a pair of longitudinally adjustable draft bars or the like 9 and 10, the draft bar 9 being pivotally connected at its rear end to the transverse frame member 7 adjacent the side frame member 5, as indicated at 11, the rear end of the draft bar 10 being pivotally connected to a clevis 12 that is secured to the intermediate portion of the frame member 7 by means of a bracket or the like 13, see particularly FIG. 1. The connections of the draft bars 9 and 10 to the platform 1 permit swinging movement of the platform 1 on a horizontal axis extending generally transversely of the platform 1 so that said platform may easily follow the baling machine 2 over uneven terrain. Preferably, the draft bars 9 and 10 are rigid with the baling machine 2 against horizontal movement transversely of the direction of movement of the baling machine 2, so that the platform 1 partakes of common forward or turning movements with the baling machine 2. The platform 1 is supported intermediate its ends by pairs of caster wheels 14 that are suitably connected to the side frame members 5 and 6 by bearing brackets or the like 15, one of which is shown in FIG. 2.

A bale receiving guide tray 16 includes a bottom member 17 and laterally spaced generally parallel side walls 18 and 19, and is mounted on the side frame member 6 and transverse frame member 7 immediately behind the rearwardly directed discharge portion 3 of the baling machine 2, and in overlying spaced relation to the adjacent portion of the deck 4, for reception of bales from the baling machine 2 and for guiding the bales in a rearward direction onto the deck 4. The tray 16 is adjustable relative to the platform 1, so that the same may be properly placed with respect to the discharge portion of different baling machines, and the side wall 19 is adjustable relative to the opposite side wall 18, whereby to accommodate bales of different widths and to retard the speed of rearward movement of the bales. In the drawings, the bales are indicated by the reference character X, and shown in some of the views by broken lines.

As the baling machine 2 produces bales X, the bales are pushed rearwardly in end-to-end relationship on the deck 4 adjacent the side frame member 6 until the first delivered bale X is disposed at the rear end portion of the platform 1. The first and second delivered bales X are then moved transversely on the deck 4 a distance slightly greater than the width of the bales, so as to be positioned out of the path of travel of oncoming bales from the baling machine. Then, as two more bales in end-to-end relationship are moved onto the deck 4 adjacent the side frame member 6, these, together with the first delivered pair of bales are moved transversely, the operation being repeated until the desired number of bales have been accumulated on the platform. For the purpose of thus moving the bales transversely of the platform 1, an elongated reciprocatory transfer or pusher bar 20 is mounted for movements between a bale receiving position in side-by-side relation to the side frame member 6 and a second or bale transfer position in laterally inwardly spaced parallel relation from its bale receiving position. The transfer bar 20 is secured intermediate its ends to a pair of mounting feet 21 that project upwardly through transverse slots 22 in the deck 4, see particularly FIGS. 1, 6 and 7. The feet 21 are each welded or otherwise rigidly secured at their lower ends to one of a pair of horizontally disposed parallel legs 23 and 24 each of which underlies a different one of the slots 22, and which are connected by cross members 25 and 26 to provide a generally rectangular frame including angular braces 27. The legs 23 and 24, as well as the cross member 25, are preferably in the form of angle iron, the cross member 26 and angle braces 27 being cross sectionally channel-shaped, see particularly FIG. 7. The frame comprising the legs 23 and 24 is supported between adjacent ones of the cross members 8 by rollers that are journalled for rotation on generally vertical axes on the legs 23 and 24, said rollers 28 being received in opposed channel-shaped guide rails 29 welded or otherwise rigidly secured to said cross members 8. The legs 23 and 24, and the transfer bar 20 carried thereby, are yieldingly urged toward the adjacent side frame member 6 by a coil tension spring 30 connected at one end to the cross member 25 and at its opposite end to the side frame member 6, see FIG. 7. Means for imparting bale engaging and transfer movements to the transfer bar 20, against yielding bias of the spring 30, comprises a fluid cylinder 31 which underlies the leg 23 and which is connected at one end to the side frame member 6, and a cooperating piston 32 having a piston rod 33 rigidly secured at its outer end to the adjacent end of the leg 23. A cushioning element or bumper 34 projects outwardly from said adjacent end of the leg 23 and is adapted to engage an abutment element 35 secured to the adjacent cross member 8 to prevent over-travel of the legs 23 and 24 and transfer bar 20.

For the purpose of obtaining engagement of the bales X for the greatest possible portion of the links thereof by the transfer bar 20 when moving the bales transversely on the deck 4, the transfer bar 20 is provided at its front end with an extension member 36 that is pivotally mounted intermediate its ends for rotation on a vertical axis between a pair of vertically spaced fingers 37 projecting forwardly from the front end of the transfer bar 20, see particularly FIGS. 1 and 2. In view of the fact that bales are moving substantially continuously from the baling machine 2 rearwardly toward the platform 1, the possibility exists that a rearwardly moving bale X may impinge against the front end of the transfer bar 20 during its return movement toward the side frame member 6, by using the pivoted extension member 36, engagement thereof by a rearwardly moving bale during retracting movements of the transfer bar 20, the extension member 36 will merely be caused to rotate, as shown in dotted lines in FIG. 17, while the transfer bar 20 moves to its retracted position shown in full lines in FIG. 18. It will be noted that the opposite ends of the extension member 36 are beveled, as indicated at 38 to facilitate passage thereby of a rearwardly moving bale when the transfer bar 20 is in its retracted position.

Bale shifting movement of the transfer bar 20 is controlled by a bale sensing element 39 that is mounted for swinging movements into and out of the path of travel of bales discharged on to the deck 4 from the baling machine 2, and other control mechanism now to be described. With reference to the diagram of FIG. 16, it will be seen that fluid under pressure is introduced to one end of the cylinder 31 from a reservoir 40 through a conduit 41 in which is interposed a pump 42, a valve indicated in its entirety by the numeral 43, and a conduit 44 extending from the valve 43 to the cylinder 31. The valve 43 comprises a valve body 45 and a cooperating axially movable valve spool 46, the spool 46 formed with a plurality of axially spaced lands that cooperate with the valve body 45 to define axially spaced annular passages 47, 48, 49 and 50. The conduit 44 communicates with the annular passage 47 through a port 51 in the valve body 45, and a return line 52 extends from the reservoir 40 to the valve body 45, the same being connected to axially spaced ports 53, 54 and 55. The port 53 is adapted to communicate with the annular passage 47, the port 54 with the annular passages 48 and 49, and the port 55 with the annular passage 50. The conduit 41 communicates with a pair of axially spaced ports 56 and 57, the former of which is adapted to communicate selectively with the annular passages 47 and 48, and the latter of which is adapted to communicate selectively with the annular passages 49 and 50, responsive to movement of the valve spool 46. A conventional pressure relief valve 58 is interposed in a conduit 59 that is connected at its oposite ends to the conduits 41 and 52 to by-pass the valve 43.

The valve spool 46 is shown in FIG. 16 in a neutral position, wherein fluid is pumped from the reservoir 40 through the conduit 41, both ports 56 and 57 and annular passages 48 and 49 through the port 54 and conduit 52 to the reservoir 40. Further, it will be seen that, with the valve spool 46 in its neutral position, that the conduit 44 from the cylinder 31 is in communication with the reservoir through the ports 51 and 53 and annular passage 47. Movement of the valve spool 46 to the right with respect to FIG. 16 will cause the port 56 to communicate with the port 51 through the annular passage 47, whereby fluid under pressure will be introduced to the cylinder 31 to cause bale shifting movement to be imparted to the transfer bar 20. Then, when the valve spool 46 is returned to its neutral position shown in FIG. 16, the spring 30 will impart return movement to the transfer bar 20 and the piston rod 33 coupled thereto, to cause fluid in the cylinder 31 to be returned to the reservoir through the conduits 44 and 52, their respective ports 51 and 53 and annular passage 47. The fluid pressure system further involves a fluid pressure operated motor 60 that is interposed in a conduit 61 that communicates at one end with a port 62 in the valve body 45, the other end of the conduit 61 leading to the reservoir 40. The port 62 is adapted to communicate selectively with the ports 55 and 57 through the annular passage 50, and a conventional metering valve 63 is interposed in the conduit 61, between the valve 43 and fluid pressure operated motor 60. The purpose of the motor 60 and parts driven thereby will be hereinafter described.

The valve 43, motor 60 and linkage operatively connecting the sensing element 39 to the valve 43, are contained within a protective housing 64 having top and bottom walls 65 and 66 respectively, end walls 67, and a side closure plate 68, the housing being welded or otherwise rigidly secured to the outer surface of the side frame member 6 adjacent the rear end of the platform 1. The sensing element or arm 39 comprises a pair of arm sections 69 and 70, the former of which is rigidly secured, as indicated at 71 to the upper end of a vertically disposed shaft 72 that extends downwardly through the top wall box 65 of the housing 64 and suitably journalled therein. The arm section 70 is releasably locked to the arm section 69 by a pair of clamping bolts or the like 73 for longitudinally extensible and retractable adjustment movements of the arm section 70, for a purpose which will hereinafter become apparent. The shaft 72 has welded or otherwise rigidly secured thereto a radially outwardly projecting arm 74 to which is secured one end of a coil tension spring 75, the other end of the spring 75 being connected to the side frame member 6 adjacent the front end portion of the housing 64 by means of an anchoring hook or the like 76, see FIGS. 8 and 9. The spring 75 yieldingly urges the shaft 72 in a direction of rotation counterclockwise with respect to FIGS. 1 and 9, rotation in this direction being limited by engagement of a radial abutment arm 77, fast on the shaft 72, with a stop member 78 bolted or otherwise rigidly secured to the under surface of the top wall 65 of the housing 64. As shown in FIG. 1, when the abutment arm 77 is disposed in engagement with the stop member 78, the sensing element or arm 39 projects angularly forwardly and toward the opposite side of the platform 1, the outer end of the arm section 70 lying in the path of rearward movement of bales X delivered from the baling machine 2. With reference particularly to FIG. 8, it will be noted that the surfaces of the abutment arm 77 and stop member 78 which engage each other are disposed at an oblique angle to the horizontal plane in which the abutment arm 77 rotates in common with rotary movement of the shaft 72. This arrangement provides a dampening effect on the sensing element or arm 39 and shaft 72 when the spring 75 is permitted to move the same to its position of FIG. 1. The lower end portion of the shaft 72 is journalled in a pivot bracket 79 that is adjustably secured to the bottom wall 66 of the housing 64 by nut-equipped screws or the like 80 that extend downwardly through slots 81 in the pivot bracket 79 and through suitable openings in the bottom wall 66. A horizonally disposed pivot arm 82 overlies the pivot bracket 79, and is provided with a central boss 83 which rotatably receives the shaft 72. The boss 83 is formed with a radially outwardly projecting lug 84 in which is mounted a pair of spring pressed ball detents 85 that are adapted to be received in an axially extended radially outwardly opening recess 86 in the shaft 72, see particularly FIG. 10, whereby rotary movement of the shaft 72 imparts like rotary movement to the pivot arm 82. As further shown in FIGS. 10 and 14, rotary movement of the pivot arm 82 in one direction is limited by an upstanding stop finger 87 integrally formed with the pivot bracket 79. Pressure of the ball detents 85 against the shaft 72 is regulated by nut-equipped adjustment screws or the like 88. A plate-like shifter fork 89 is pivotally secured at one end to the valve spool 46, as indicated at 90, and terminates at its other end in spaced legs 91 and 92 which straddle the boss 83 immediately above the pivot arm 82. The legs 91 and 92 of the shifter fork 89 are provided with depending pins 93 and 94 respectively, that are adapted to received in respective ones of pairs of radially outwardly opening notches 95 and 96 in the opposite ends of the pivot arm 82, responsive to shifting movements of the shifter fork 89 about the axis of the pivotal connection 90 thereof to the valve spool 46.

When the shifter fork 89 is shifted to its position of FIG. 14, with the pin 93 received in the notch 95, bale imparted rotary movement of the sensing arm 39 and shaft 72, in a clockwise direction with respect to FIGS. 1 and 14, will cause the valve spool 46 to be moved to the right with respect to FIG. 16, whereby fluid under pressure flows from the pump 42 to the cylinder 31, to the conduit 41, port 56, annular passage 47, port 51 and conduit 44. With the valve spool 46 thus moved, the annular passage 49 is in register with the port 57, but is out of register with any other port in the valve body 45. Hence, no fluid flow exists through the port 57. It will be noted that, should bale imparted angular movement of the sensing arm 39 and shaft 72 be greater than that of the pivot arm 82, the ball detents 85 be forced radially outwardly of the recess 86 to permit such excess angular movement to be imparted to the sensing arm 39. Flow of fluid under pressure to the cylinder 31, causes the transfer bar 20 to shift the bales X laterally, until the bale which engages the sensing arm 39 moves beyond the free end of the arm section 70 thereof. This done, the spring 75 causes the shaft 72 to be rotated to bring the sensing arm 39 to its position of FIG. 1, the pivot arm 82 moving the valve spool 46 to its neutral position, thus permitting fluid to flow from the cylinder 31 to the reservoir 40 through the valve 43. Inasmuch as the sensing arm 39 cannot return to its position of FIG. 1 until disengaged by a bale X, the amount of bale shifting movement of the transfer arm 20 is determined by the length of the sensing arm 39. Hence, the length of bale shifting travel of the transfer arm 20 may be adjusted by extending or retracting the sensing arm section 70 and locking the same by means of the locking screws 73.

The shifter fork 89 is normally urged toward a position wherein the pin 93 is received within the notch 95 of the pivot arm 82 by a control device in the nature of an inverted cross sectionally generally U-shaped pressure plate 97 that is pivotally mounted between an adjacent pair of the cross members 8, as indicated at 98 for swinging movements on a horizontal axis extending longitudinally of the platform 1 through an opening 99 in the deck 4. The pressure plate 97 is provided with a transverse flange 100 through which extends a guide rod or the like 101 that is rigidly secured at one end to the side frame member 5, see particularly FIG. 4. An adjustment nut 102 is screw threaded on the intermediate portion of the guide rod 101 and forms an abutment for one end of a coil compression spring 103 which loosely encompasses the guide rod 101 between the adjustment nut 102 and the flange 100 to yieldingly urge the pressure plate 97 in a direction of swinging movement to raise the free end portion thereof above the level of the deck 4 through the opening 99 therein. As shown in FIG. 4, the pressure plate 97 slopes upwardly toward the adjacent side frame member 5 so as to be pressed downwardly by one of the bales X as the bales are moved tranversely by the transfer bar 20. An elongated rigid link 104 is pivotally connected at one end to the intermediate portion of the shifter fork 89, the opposite end portion thereof extending through a suitable opening in the transverse flange 100 of the pressure plate 97. Adjustment of the effective length of the link 104 is obtained by a washer-equipped nut 105 that is screw threaded on said other end of the link 104 and which has a butting engagement with one side of the transverse flange 100, see particularly FIG. 5. A second washer equipped nut 106 is screw threaded on said other end of the link 104 in spaced relation to the opposite side of the flange 100, and a coil compression spring 107 encompasses the link 104 between the flange 100 and the nut 106 to yieldingly urge the nut 105 toward engagement with the adjacent side of the flange 100. Preferably, a sleeve 108 is slidably mounted on the link 104 within the spring 107, to prevent said flange 100 from rubbing on the threads of the link 104. The spring 107 yielding urges the link 104 in a direction to move the pin 94 of the shifter fork 89 into its cooperating notch 96 in the pivot arm 82 when the pressure plate 97 is depressed by a bale X resting thereupon. Further, the spring 107 permits movement of the pressure plate 97 to an extent greater than that required to shift the shifter fork 89 from its position shown in FIGS. 11 and 14 to a position wherein the pin 94 is received in the notch 96.

The pressure plate 97 cooperates with the sensing arm 39 to control operation of the fluid pressure operated motor 60 and bale impelling or discharging mechanism operated by the motor 60. A horizontally disposed drive shaft 109 is disposed rearwardly of the rear edge of the deck 4 and extends from the motor 60 toward the opposite side frame member 5, the shaft 109 being journalled in spaced bearings 110 suitably mounted on the platform 1. A pair of laterally spaced endless link chains 111 are entrained over sprocket wheels 112 keyed or otherwise rigidly secured to the drive shaft 109 adjacent the bearings 110, the link chains 111 each providing an upper delivery flight 113 which rides on the top surface of the deck 4, and a lower return flight 114 underlying the cross frame members 8, see particularly FIG. 6. The link chains 111 are entrained over idler sprockets 115 that are journaled on stub shafts or bolts 116 mounted in bracket 117 between the front end of the deck and the front frame member 7, see FIGS. 1 and 6. The delivery flights 113 of the chains 111 each move rearwardly with respect to the platform 1 between confining flanges 118 and 119 the former of which are formed to provide ramps 120 that slope upwardly from the level of the deck 4 in the direction of the side frame member 5 or, in other words, in the direction of shifting movement of the bales X as they are moved laterally by the transfer bar 20. The ramps 120 permit the bales X to move easily over the underlying delivery flights of the link chains 111. An elongated bale engaging impeller or push-off bar 121 extends in a direction transversely of the platform 1, and is bolted or otherwise rigidly secured to each of the link chains 111, as indicated at 122, see particularly FIG. 6. During its delivery movement rearwardly over the deck 4, the push-off bar 121 rides on the upper edges of the confining flanges 118. During its return movement from the rear end portion of the platform 1 to the front end portion thereof below the deck 4, the impeller or push-off bar 121 is supported at its opposite ends in opposed longitudinally extending channels or supporting rails 123 that are welded or otherwise rigidly secured to the bottom portions of the cross members 8.

An elongated stop bar 124, preferably made from angle iron or the like, is bolted or otherwise releasably secured to the deck 4 alongside the side frame member 5, by means of nut-equipped bolts or the like 125, see FIGS. 1 and 4. The stop bar 124 is adapted to be adjustably moved transversely of the deck 4 with the bolts 125 extending through apertures 126, or removed altogether from the platform 1, depending upon the width of the bales X to be arranged on the platform 1. FIGS. 17 and 18 show the platform 1 with the stop bar 124 removed.

As the baling machine 2 and platform 1 move forwardly over a field, the platform 1 is subject to jostling or bouncing movement due to irregularities in the terrain, tending to cause the bales X to slide out of position on the deck 4, as the bales are accumulated thereon. Transverse sliding movement of the bales X is restricted by the delivery flights 113 of the link chains 111 and the confining flanges 118 and 119. However, the chains and confining flanges do not overlie hinder sliding movement of the bales X in directions longitudinally of the deck 4; and for this reason, longitudinally adjustable stop members 127 are both releasably secured to the front end portion of the deck 4 by nut-equipped bolts or the like 128 that are adapted to be received in selected ones of openings 129 arranged in longitudinally extending rows in the deck 4, see FIG. 1. The stop members 127 limit accidental forward movement of the bales X, out of engagement with the pressure plate 97 and accidental rearward movement of the bales is limited by a tail-gate or the like 130 that extends ecross the platform 1 rearwardly of the rear edge of the deck 4, and which is pivotally secured at its opposite ends to the frame members 5 and 6 by means of axially aligned nut-equipped pivot bolts 131 and 132. The tail-gate 130 comprises a main body portion 133 and end flanges 134 and 135 through which respective ones of the pivot bolts 131 and 132 extend, see particularly FIG. 12. The bolt 131 is provided adjacent its head with a cross-sectionally square shank portion 136 on which is mounted a radially outwardly projecting adjustment arm 137 for common rotation with the bolt 131. A tubular spacer 138 encompasses the bolt 131 between the adjustment arm 137 and the rear end portion of the side frame member 5, the flange 134 of the tail-gate 130 being journalled on the spacer 138. As further shown in FIG. 12, the bolt 131 and adjustment arm 137 are held against rotary movement by a clamping nut or the like 139 screw threaded on the outer end of the bolt 131. A torsion spring 140 has one end 141 extending through an opening 142 in the adjustment arm 137, and its opposite end 143 extending through an opening 144 in the end flange 134 of the tail-gate 130, and yieldingly urges the tail-gate 130 toward a generally upright position shown in FIGS. 6 and 13. Forward swinging movement of the tail-gate 130 is limited by engagement of a lower front edge portion 145 of each of the end flanges 134 and 135 with one of a pair of stop members 146 that are bolted or otherwise rigidly secured to inturned flange portions 147 of respective side frame members 5 and 6, see particularly FIGS. 12 and 13. Rubber-like cushioning blocks 148 are interposed between the stop members 146 and their respective underlying flanges 147 to cushion the impact of the edge portions 145 of the tail-gate end flanges against their respective stop members 146. For adjusting yielding bias of the spring 140, it is only necessary to loosen the clamping nut 139, swing the adjustment arm 137 to a desired position, and retighten the clamping nut 139 to hold the adjustment arm 137 in its desired set position. Such adjustment is illustrated by full and dotted line positions of the adjustment arm 137, in FIG. 13.

The speed of bale impelling or push-off movement of the impeller bar 121, as above stated, is regulated by the valve 63 in the fluid motor conduit 61, said speed preferably being equal to the speed of forward movement of the baling machine 2 and platform 1. The valve 63 is provided with a control handle 149 that projects outwardly through a suitable opening in the front wall 67, whereby the speed of the fluid motor 60 may be varied according to differences in forward speed of the platform 1 and baling machine 2.

As the baling machine 2, together with the platform 1 coupled thereto, progresses over a field, the baling machine 2 gathers the hay crop from the field and forms the same into bales X, as above described. The bales are discharged on to the deck 4 from the discharge portion 3 of the baling machine 2 in end to end relationship, each bale pushing a preceding bale rearwardly over the guide tray 16 and toward the sensing arm 39. Rearward movement of the first ejected bale moves the sensing arm 39 from the full line position thereof shown in FIG. 17, to the dotted line position thereof in FIG. 17, whereby to cause movement of the valve spool 46 to the left with respect to FIG. 16. This movement of the valve spool 46 permits fluid under pressure to be introduced to the cylinder 31 to impart bale shifting movement to the transfer bar 20 to cause the sensing arm engaging bale X and the next succeeding bale to be moved transversely of the deck 4 a distance slightly greater than the width of the bales. Also, as above described, as soon as the first delivered bale X moves transversely out of engagement with the sensing arm 39, the spring 75 will move the sensing arm 39 back to its position of FIG. 1 and its full line position of FIG. 17. As more bales are delivered to the deck 4 from the baler 2, they are shifted transversely of the deck 4 by the transfer bar 20 in the same manner as the first delivered pair of bales, the last delivered pair of bales engaging the preceding pair thereof in side-by-side relationship and causing said preceding bales to be moved transversely toward the opposite side frame member 5 or stop bar 124. When a third pair of bales is laterally shifted by the transfer bar 20, shifting movement of all of the bales causes the first delivered bale of the entire group to engage the pressure plate 97 and swing the same downwardly to the level of the deck 4, against bias of the spring 103. Downward swinging movement of the pressure plate 97 imparts movement to the rigid link 104 in a direction to shift the shifter fork 89 from its position wherein the pin 93 is received in the notch 95 to a position wherein the pin 94 is received in its cooperating notch 96 in the pivot arm 82. Then, as the first delivered bale X of the fourth pair thereof engages the sensing arm 39 and swings the same in a rearward direction, the valve spool 46 moves from its neutral position of FIG. 16 to the left. This movement of the spool 46 causes the port 55 to be closed and the port 57 to communicate with the port 62 through the annular passage 50 whereby fluid under pressure is delivered to the fluid motor 60 from the pump 42. Operation of the motor 60 causes the link chains 111 to carry the impeller or push-off bar 121 forwardly toward the front end of the platform 1 in the supporting rails 123, upwardly over the sprockets 115 and rearwardly over the deck 4 to engage the front ends of the forwardmost row of bales on the deck 4. Continued rearward movement of the impeller or push-off bar 121 causes the rear ends of the bales of the rearmost row thereof to engage the tail-gate 130 and swing the same rearwardly and downwardly against bias of the torsion spring 140, whereby to deposit the bales X on the ground rearwardly of the platform 1 without materially disturbing the row arrangement and side-by-side arrangement in which the bales were disposed on the platform 1 prior to discharge thereof.

It will be noted that, as the bales X are being rearwardly discharged from the platform 1, the sensing arm 39 is swung rearwardly by the adjacent bale X to a position shown in FIG. 18, which enables the adjacent bales to pass thereby. When the sensing arm 39 is swung to this position, the ball detents 85 are moved out of the recess 86 to permit extended angular movement of the sensing arm 39 without the necessity of moving the valve spool 46 to the left, with respect to FIG. 16, further than is necessary for operation of the fluid motor 60. As soon as the bales are discharged to the ground, the sensing arm 39 swings back to its position of FIG. 1, and the pressure plate 97 moves to its upwardly sloping position of FIG. 4 in readiness for further accumulation of bales as they are continuously fed to the platform by the baling machine 2. As the sensing arm 39 swings back to its position of FIG. 1, the shaft 72 rotates to again cause reception of the ball detents 85 in the recess 86, whereupon the pivot arm 82 will rotate to bring the valve spool 46 to its neutral position of FIG. 16, at which point the lug 84 engages the stop finger 87 to hold the valve spool 46 in said neutral position. Release of the pressure plate 97 will cause the shifter fork 89 to shift its pin 94 out of engagement with the notch 96, and the pin 93 into engagement with the notch 95, whereby to render the transfer arm 20 operative responsive to engagement of the sensing arm 39 by the next bale X.

A feature of the present invention resides in the arrangement whereby an accumulated group of bales is rearwardly discharged to the ground at a speed substantially equal to the speed of forward movement of the platform, to prevent separation of the bales or buckling of adjacent bales in one direction or another, so that the group thereof becomes disarranged. However, it will be appreciated that suitable means may be utilized to prevent disarrangement of the group of bales when said group is rearwardly discharged at speeds other than that of the platform.

It will be further appreciated that the platform 1 may be built to accommodate any desired number of bales in side-by-side relation, or any desired number of rows of said bales, and that the platform herein illustrated and described is but one example.

While I have shown and described a single embodiment of my hay bale accumulator, and have suggested modifications which may be made therein, the same is capable of further modification without departure from the spirit and scope of the invention, as defined in the claims.

What I claim is:

1. For use with mobile hay baling machines of the type involving a rearwardly directed discharge portion for rearward delivery of bales elongated in a direction parallel to the direction of movement of the baling machine,
   (a) a generally horizontally disposed hay bale accumulator platform,
   (b) means connecting said platform to the rear end portion of a baling machine for common traveling movements therewith,
   (c) a portion of said platform being disposed rearwardly of the discharge portion of said baling machine and having guiding means for the endwise reception of said bales therefrom in horizontally disposed end-to-end relationship,
   (d) end-to-end bale transfer means of greater length than one bale for shifting a plurality of said bales in said end-to-end relationship on said platform in a lateral direction transversely of delivery movement thereof from said baling machine a distance at least equal to the width of one of said bales, (e) control means disposed in the path of bales delivered on said platform including a bale end sensing element responsive to predetermined end-to-end movement of two rearwardly delivered bales on said platform for controlling simultaneous lateral movement thereof, (f) plural bale end engaging impeller means carried by said platform, (g) and means operative responsive to accumulation of a predetermined number and order of bales on said platform for imparting movements to said impeller element relative to said platform to cause said impeller element to engage and discharge said predetermined order of bales to the ground rearwardly of said platform and at a speed at least equal to the speed of forward travel of said platform, whereby to insure and preserve the order formation of the bales established on the platform when deposited on the ground.

2. For use with mobile hay baling machines of the type involving a rearwardly directed discharge portion for rearward delivery of bales elongated in a direction parallel to the direction of movement of the baling machine, (a) a generally horizontally disposed hay bale accumulator platform, (b) means connecting said platform to the rear end portion of a baling machine for common traveling movements therewith, (c) one side edge portion of said platform being disposed rearwardly of the discharge portion of said baling machine for reception of said bales therefrom in horizontally disposed end-to-end relationship, (d) a bale engaging transfer member adapted to engage a longitudinal side of a plurality of said bales in said end-to-end relationship and mounted on said platform for bale transfer and return movements between the side edge of the platform adjacent said discharge portion and the other side edge of said platform, (e) means for imparting said movements to said transfer member a distance at least equal to the width of one of said bales, (f) control means for said last-mentioned means including a bale sensing element mounted in the path of rearward travel of a delivered end bale of said plurality on said platform, (g) a bale engaging impeller element mounted on said platform for movements relative thereto and in directions longitudinally relative to the direction of movement of said platform, (h) and means operative responsive to accumulation of a predetermined number of bales on said platform for imparting movements to said impeller element relative to said platform to cause said impeller element to discharge said bales to the ground rearwardly of said platform and at a speed at least equal to the speed of forward travel of said platform, whereby to insure and preserve the order formation of the bales established on the platform when deposited on the ground.

3. For use with mobile hay baling machines of the type involving a rearwardly directed discharge portion for rearward delivery of bales elongated in a direction parallel to the direction of movement of the baling machine, (a) a generally horizontally disposed hay bale accumulator platform, (b) means connecting said platform to the rear end portion of a baling machine for common traveling movements therewith, (c) one side edge portion of said platform being disposed rearwardly of the discharge portion of said baling machine for reception of said bales therefrom, (d) a bale engaging transfer member mounted on said platform for reciprocatory movements between a bale receiving position at the side edge of said platform adjacent said discharge portion and a bale transfer position spaced from said receiving position toward the opposite side edge of said platform a distance at least equal to the width of one of said bales, (e) means for imparting said reciprocatory movement to said transfer member, (f) control means for said last mentioned means including a bale sensing element mounted in the path of rearward travel of a delivered bale on said platform, whereby a single cycle of reciprocatory movement is imparted to said transfer member for each engagement of said sensing element by a rearwardly moving bale, (g) said transfer member moving each bale after the first delivered one thereof together with antecedent bales to form a row of bales in side-by-side relationship, said row extending transversely of said platform, (h) a bale engaging impeller element mounted on said platform for movements relative thereto and in directions longitudinally relative to the direction of movement of said platform, (i) drive means for imparting movements to said impeller element relative to said platform to cause said impeller element to discharge said bales to the ground rearwardly of said platform and at a speed at least equal to the speed of forward travel of said platform, (j) and control means including said sensing element and a bale engaging control device cooperating with said sensing element responsive to predetermined transverse movements of the first delivered bale of said row thereof and engagement of said sensing element by a subsequently delivered bale for energizing said drive means.

4. For use with mobile hay baling machines of the type involving a rearwardly directed discharge portion for rearward delivery of bales elongated in a direction parallel to the direction of movement of the baling machine, (a) a generally horizontally disposed hay bale accumulator platform, (b) means connecting said platform to the rear end portion of a baling machine for common traveling movements therewith, (c) one side edge portion of said platform being disposed rearwardly of the discharge portion of said baling machine for reception of said bales therefrom, (d) an elongated bale engaging transfer member mounted on said platform for reciprocatory movements between a bale receiving position at the side edge of said platform adjacent said discharge portion and a bale transfer position spaced from said receiving position toward the opposite side edge of said platform a distance at least equal to the width of one of said bales and adapted to engage one side of a pair of said bales disposed in end-to-end relationship, (e) means for imparting said reciprocatory movement to said transfer member, (f) control means for last mentioned means including a bale engaging sensing element at the rear end portion of said platform and in the path of rearward travel of the first-delivered bale on said platform and spaced from said baling machine discharge portion a distance at least equal to the combined lengths of a pair of bales disposed in end-to-end engagement, whereby delivery of said pair of bales to said platform energizes said transfer member moving means to cause lateral shifting of said pair of bales simultaneously, (g) subsequent bale shifting movements of said transfer member responsive to delivery of succeeding pairs of bales shifting all of said bales whereby said bales are arranged in a pair of rows extending transversely of said platform, (h) a bale engaging impeller element mounted on said platform for movements relative thereto in directions longitudinally relative to the direction of movement of said platform, (i) drive means for imparting movements to said impeller element relative to said platform to cause said impeller element to discharge said rows of bales to the ground rearwardly of said platform and at a speed at least equal to the speed of forward travel of said platform, whereby said bales are deposited on the ground in the same arrangement as that of the accumulated bales on said platform, (j) and control means including said sensing element and a bale engaging control device cooperating with said sensing element responsive to predetermined transverse movement of the first delivered bales of a given row thereof and engagement of said sensing element by the first one of the bales of a subsequently delivered pair thereof for energizing said drive means.

5. For use with mobile hay baling machines of the type having a discharge portion for delivery of bales from the baling machine, (a) a generally horizontally disposed hay bale accumulator platform, (b) means connecting said platform to a baling machine adjacent its discharge portion for common traveling movements therewith, (c) a portion of said platform being disposed for reception of said bales from said discharge portion, (d) bale transfer means for shifting said bales on said platform away from the path of delivery movement thereof from said baling machine to dispose said bales in a predetermined group arrangement, (e) control means secured to said hay bale accumulator platform and responsive to bales delivered onto said platform for activating said bale transfer means, (f) a bale discharge mechanism comprising powered endless means extending longitudinally above and below said hay bale accumulator platform, (g) hay bale engaging structure secured to and carried by said powered endless means, and (h) sensing means secured to said hay bale accumulator platform spaced from and cooperating with said control means for activating said discharge mechanism.

6. The structure of claim 5 further characterized by said powered, endless means being driven at a speed substantially equal to the speed of forward travel of said platform from front to rear at the top thereof.

7. For use with mobile hay baling machines of the type having a discharge portion for delivery of bales from the baling machine in longitudinally end-to-end relationship, (a) a generally horizontal hay bale accumulator platform, (b) means connecting said platform to a hay baling machine for common traveling movements therewith and with one edge portion of said platform disposed adjacent the discharge portion of the baling machine and extending longitudinally of the path of travel of bales delivered from the baling machine for reception of bales therefrom in horizontally disposed end-to-end relationship, (c) bale transfer means for shifting a plurality of bales in said end-to-end relationship simultaneously in a direction transversely of the direction of delivery movement of the bales from said machine and toward an opposite side edge of said platform, (d) control means including sensing means disposed to sense predetermined delivery movement of said bales in end-to-end relationship on said platform, (e) said bale transfer means being responsive to sensing of one of said plurality of bales by said sensing means to move said plurality of bales toward said opposite side edge of the platform a distance at least equal to the width of one of said bales, (f) said control means including a second sensing means for sensing the transverse movement of said bales to said opposite side edge of the platform, (g) and bale discharge means responsive to sensing of a transversely moved bale by said second sensing means and to subsequent sensing by said first mentioned sensing means of a subsequent bale delivered from the baling machine to discharge the accumulated bales from said platform to the ground.

8. For use with mobile hay baling machines of the type involving a rearwardly directed discharge portion for rearward delivery of bales elongated in a direction parallel to the direction of movement of the baling machine, (a) a generally horizontal hay bale accumulator platform, (b) means connecting said platform to a hay baling machine for common traveling movements therewith and with one side edge portion of said platform disposed rearwardly of the discharge portion of the baling machine for reception of bales discharged rearwardly therefrom in horizontally disposed end-to-end relationship, (c) bale transfer means for shifting a plurality of bales in said en-to-end relationship simultaneously in a direction transversely of said rearward movement of the bales and toward the opposite side edge of said platform, (d) control means including a sensing element disposed in the path of rearward movement of said bales in said end-to-end relationship, (e) said bale transfer means being responsive to engagement of said sensing element by one of said plurality of bales to move said plurality of bales toward said opposite side edge of the platform a distance at least equal to the width of one of said bales, (f) said control means including a second sensing element disposed in the path of transverse movement of said bales to said opposite side edge of the platform, (g) and bale discharge mechanism responsive to engagement of said second sensing element by a transversely moved bale and to subsequent engagement of said first mentioned sensing element by a rearwardly moving bale to discharge said bales rearwardly from said platform to the ground.

9. For use with mobile hay baling machines of the type involving a rearwardly directed discharge portion for rearward delivery of bales elongated in a direction parallel to the direction of movement of the baling machine, (a) a generally horizontal hay bale accumulator platform, (b) means connecting said platform to a hay baling machine for common traveling movements therewith and with one side edge portion of said platform disposed rearwardly of the discharge portion of the baling machine for reception of bales discharged rearwardly therefrom in horizontally disposed end-to-end engagement, (c) bale transfer means for simultaneously shifting a plurality of bales in said end-to-end engagement in a step-by-step motion transversely of said rearward movement of the bales and toward the opposite side edge of said platform to provide a plurality of rows of said bales in end-to-end engagement, (d) and control means including sensing means disposed to sense predetermined rearward delivery movement of said bales in said end-to-end engagement on the platform, (e) said bale transfer means being responsive to sensing of one of said plurality of bales by said sensing means to move said plurality of bales toward said opposite side edge of the platform a distance at least equal to the width of one of said bales at each step of said step-by-step movement, (f) said control means including a second sensing means for sensing the transverse movement of bales to said opposite side edge of the platform, (g) and bale discharge mechanism including an impeller element of greater length than the transverse end of one bale carried by said platform and responsive to sensing of a bale by said second sensing means to simultaneously engage and discharge all said rows of bales rearwardly from said platform to the ground, and including means for driving said impeller rearwardly at a speed at least equal to the speed of forward travel of said platform, whereby to insure and preserve the order formation of the bales established on the platform when deposited on the ground.

10. The structure defined in claim 9 in further combination with means operatively interconnecting said first mentioned sensing means and said second sensing means, whereby said discharge mechanism is responsive to the sensing of rearwardly delivered bales on said platform subsequent to sensing of transversely moved bales by said second sensing means to discharge said rows of bales from said platform to the ground.

11. For use with mobile hay baling machines of the type having a discharge portion for delivery of bales from the baling machine, (a) a generally horizontally disposed hay bale accumulator platform, (b) means for connecting said platform to a baling machine adjacent its discharge portion for common traveling movements therewith, (c) a portion of said platform being disposed for reception of bales in end-to-end relationship from said discharge portion, (d) bale transfer means for shifting said bales on said platform away from the path of delivery movement thereof from said baling machine to dispose said bales in a predetermined group arrangement, (e) discharge mechanism for removing the group of bales from said platform to deposit said bales on the ground in said group arrangement, (f) and control means for actuating said bale transfer means responsive to predetermined movement of a leading bale of said bales in end-to-end relationship on said platform from said baling machine discharge portion and for actuating said discharge mechanism responsive to accumulation of a predetermined number of bales on said platform, (g) said bale transfer means comprising:
(1) a reciprocatory transfer member elongated in the direction of delivery movement of bales from said baling machine and movable across the path of delivery movement of said bales toward and away from a normal position at one side of said path of delivery movement,
(2) means for imparting reciprocatory movement to said transfer member.

References Cited by the Examiner
UNITED STATES PATENTS

| | | | |
|---|---|---|---|
| 2,046,426 | 7/36 | Rausch | 56—477 |
| 2,431,892 | 12/47 | Russell | 214—41 |
| 2,462,021 | 2/49 | Harker | 214—308 |
| 2,468,055 | 4/49 | Gibler | 214—353 |
| 2,578,802 | 12/51 | Heidrick et al. | 214—654 |
| 2,613,021 | 10/52 | Bowes | 53—62 |
| 2,710,105 | 6/55 | Schwartz | 214—83.36 |
| 2,748,965 | 6/56 | Grey. | |
| 3,010,593 | 11/61 | Adams et al. | 214—519 |
| 3,077,271 | 2/63 | Siempelkamp | 214—16.6 |

HUGO O. SCHULZ, *Primary Examiner.*

MORRIS TEMIN, *Examiner.*